Jan. 15, 1957  C. JOHNSON  2,777,351
CONTROL SYSTEM
Filed Oct. 29, 1945  3 Sheets-Sheet 2

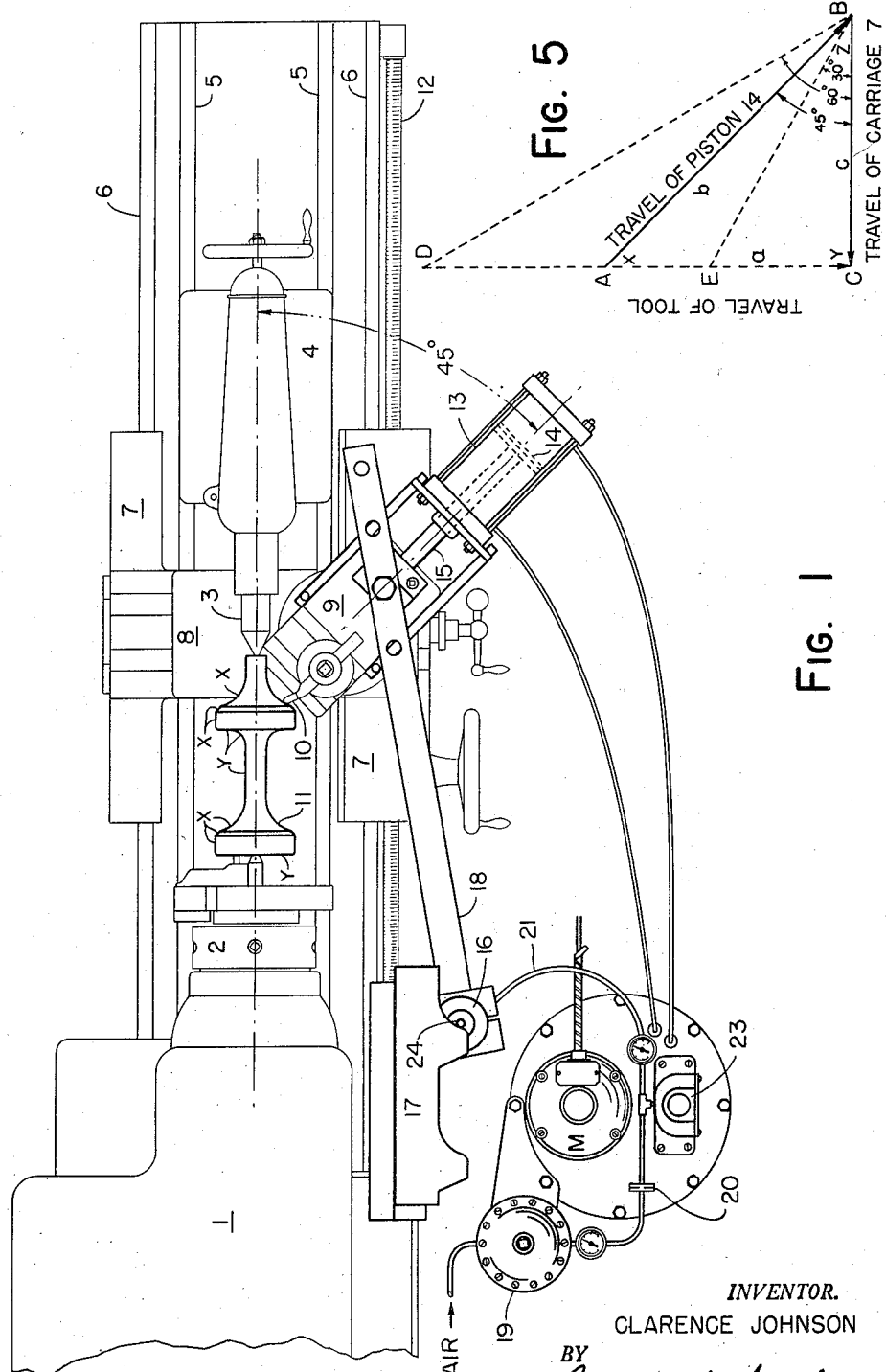

INVENTOR.
CLARENCE JOHNSON
BY
Raymond D. Junkin
ATTORNEY

Jan. 15, 1957

C. JOHNSON
CONTROL SYSTEM 2,777,351

Filed Oct. 29, 1945

INVENTOR.
CLARENCE JOHNSON
BY
Raymond W Junkins
ATTORNEY

United States Patent Office 2,777,351
Patented Jan. 15, 1957

2,777,351

CONTROL SYSTEM

Clarence Johnson, South Euclid, Ohio, assignor to Bailey Meter Company, a corporation of Delaware Application October 29, 1945, Serial No. 625,237

4 Claims. (Cl. 82—14)

This invention relates to duplicators for controlling the operation of a material forming machine, so that a work piece is formed to a contour or configuration determined by a template, pattern, sample, cam or the like.

In accordance with my invention the template or cam for producing the desired configuration on the work piece is scanned by a tracer regulating the discharge of a fluid from a valve or nozzle to the atmosphere. The variations in the shape of the template cause corresponding changes in the rate of fluid discharged from the nozzle, which variations are then used to control the relative positioning of the tool and work piece.

Further, in accordance with my invention the changes in fluid pressure control the relative positioning of the tool and work piece through an hydraulic relay and servomotor to the end that ample power is available for accurately positioning the tool relative to the work piece, or vice versa.

A particular object of the present invention is to provide a readily attachable or detachable accessory to a standard or commercial form of lathe or similar material working machine. The duplicating attachment which I have invented is readily applied to a standard lathe, for example, and may be as readily removed therefrom, thereby returning the lathe to its normal condition for operation. In other words, the lathe does not permanently become a special machine tool which of necessity must stand idle in the absence of duplicating or contouring work to be done. With my invention the duplicating attachment may be removed and the lathe utilized in normal manner. Even if the attachment is not removed it does not seriously interfere with normal operation of the lathe since only the compound rest is inoperative, the cross-slide remaining operable by hand and the lead screw drive available.

Another object is to provide a control system for a lathe or similar metal forming machine wherein what I term a "single motion unit" may perform satisfactorily certain operations with previously required a "dual motion apparatus."

Obviously a duplicator or contour control of the type forming the subject matter of my invention may be employed with material forming machines or machine tools of various types, such as milling machines, lathes, slotters, planers, die sinking machines, or other machines in which the relative feed between the tool and the work may be suitably controlled. By way of example I illustrate and will describe my invention as applied particularly to metal turning engine lathes. Further applications and modifications of my invention will be readily apparent. By way of further example I briefly describe the adaptation of my invention to a vertical boring mill.

In the drawings:

Fig. 1 is a plan view of a portion of an engine lathe illustrating the application of my invention thereto.

Figure 4:
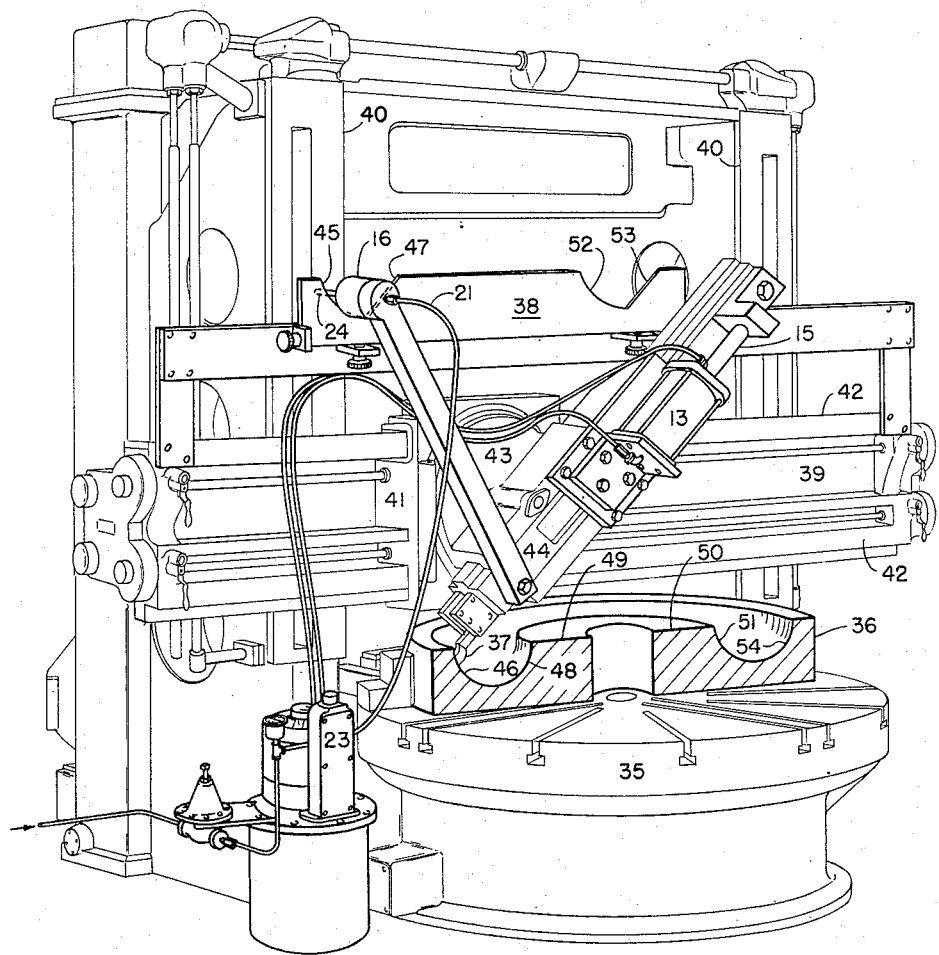

Fig. 4 somewhat diagrammatically illustrates the adaptation of my invention to a vertical boring mill.

Fig. 5 is a graph in connection with Fig. 1.

As is well understood by those familiar with the art, in some machine tools, such as lathes, the tool is moved longitudinally and transversely of the work piece which, except for rotation about its center, remains stationary. In other machine tools, such as some types of milling machines, the work piece may be moved in two directions while the tool, except for rotation about its axis, remains stationary. In some other types of milling machines and usually in die sinking machines the tool may be moved in one or more directions and the work piece may also be moved in one or more directions. In all instances it will be observed however that it is the relative movement between the tool and work piece that causes the work piece to be formed to a desired shape. As one specific embodiment I have chosen to illustrate and describe my invention incorporated in a lathe wherein the work piece, except for rotation about its center, remains stationary and the tool is moved transversely and longitudinally thereof. The second embodiment of my invention, as illustrated in Fig. 4, is similar in function in that the work piece, except for rotation about its center, remains stationary and the tool is moved in two directions relative thereto. It will be evident that my invention is applicable to a wide variety of machine tools and that when I speak of relative movement between the tool and work piece I include either an arrangement where the tool is stationary and the work piece is moved, or where the work piece is stationary and the tool is moved, or a combination of the two.

The pattern or template has a shape corresponding to the desired path of movement of the tool to produce a desired finished work piece. By "corresponding" is meant that not only is the pattern or template the same shape as the desired work piece either in greater or smaller proportion thereto, but also that the pattern or template may be of any desired distorted shape to compensate for characteristics of the machine. While the pattern or template must "correspond" to the desired work piece, it is not necessarily identical in contour, and therefore the term "correspond" implies that the pattern or template is purposely designed to result in a desired contour of the work piece to be produced. I have found it desirable whenever possible to utilize a template of exactly the shape I desire to form the work piece. This greatly simplifies the construction of the template and the checking of finished work. An advantage of my invention is that I may construct the template as required to produce the desired shape of the work piece.

Throughout the following specification and in the claims I have indicated that the work piece is formed to correspond to the profile or shape of the master. By such language I do not intend to imply that the work piece is brought to the exact shape of the master, but as will be evident to those familiar with the art the master will be formed so that the ultimate shape of the work piece produced is that desired, and that therefore the shape of the work piece will differ from that of the master by the amount of angularity, etc. in the mechanism. Furthermore, I use the terms contour, profile, shape, and the like in a broad sense and not with any limiting distinction between the profile of a 2-dimensional silhouette or the surface configuration of a body for example. In general, the pattern dictates the desired shape of the work piece. I use profile and contour interchangeably. The pattern has the desired shape, although not necessarily the exact shape.

By strict definition one might be led to believe that

"profile" is only the edge shape of a 2-dimensional silhouette for example. Usually it is spoken of as the edge shape of a thin plate template, although such a template is a 3-dimensional object. Usually "contour" is a surface configuration, or at least of a portion of the surface of a 3-dimensional object. Applicant intends to make it clear that in speaking of profile or contour he means the forming of a work piece to a shape as dictated by that of a template or pattern and without any specific or limiting meaning being given to the terms "profile" and "contour."

Referring now to Fig. 1, I show my invention applied to an engine lathe 1 having a head stock 2 adapted to be rotated by any suitable means. A carriage 4 is movable longitudinally along the bed of the lathe in suitable ways 5 and supports a tail stock 3. Also movable longitudinally along the bed of the lathe in suitable ways 6 is a carriage 7 upon which is mounted a cross-slide 8 movable on ways transversely of the bed of the lathe.

Mounted on and carried by the cross-slide 8 is an angularly positionable compound rest 9 forming a tool support for a tool 10. Movements of the tool 10 relative the work piece 11 are produced through the agency of the normal lead screw 12 and through the agency of a hydraulic cylinder 13 having a piston 14 adapted to position the compound rest 9 through the agency of a piston rod 15. The hydraulic cylinder 13, piston 14 and piston rod 15 are supported by and carried by the compound 9, angularly positionable therewith, positionable by and with the cross-slide 8 transversely of the axis of the lathe, and carried by the carriage 7 longitudinally of the lathe when the carriage 7 is so positioned through the agency of the lead screw 12 or otherwise.

A study of Fig. 1 will show that the top slide of the compound 9 (which carries the tool 10) is positionable relative that portion of the compound 9 fixed to the cross-slide 8, through the agency of the piston rod 15. If the angularly positionable upper portion of the compound 9 is so turned that the axis of the piston rod 15 is normal to the axis of the lathe and work piece, then transverse movement of the cross-slide 8 will result in transverse positioning of the tool 10 normal to the axis of the work piece. If, however, the angularly positionable upper portion of the compound 9 is so moved that its center line (as in Fig. 1) is at an angle of 45° with the axis of the work piece, then (with no longitudinal movement of the carriage 7) the tool may be moved toward or away from the work piece 11 through the agency of the piston 14 at an angle of 45° to the axis of the work piece.

While I have by way of example illustrated this angular relation to Fig. 1 as being 45°, it is apparent that other angular relationships may under certain conditions be more advantageous. The exact angular relationship depends upon various things, such as the desired shape and finish of the work piece, the speed of the lead screw 12, and the speed of travel of the piston rod 15. The speed of travel of the piston 14 in the cylinder 13 is preferably several times faster than the speed of travel of the carriage 7 by the lead screw 12. If the piston speed is fast enough relative the carriage then the cutting of the work is dependent only on the template.

In the example being described I preferably travel the carriage 7 from right to left at a uniform speed through the agency of the regular lead screw 12. The tool 10 is moved toward or away from the axis of the work piece by the piston rod 15. The resultant positioning of the tool 10 relative the work piece is a vector resultant of the two motions. By proper choice of the speed of such movements the work piece 11 may be turned to a taper or to have straight shoulders normal to the axis of the work piece. I will now describe the conditions under which three general types of cuts may be taken, and it will be appreciated that intermediate types of turning may be accomplished by modifications of the adjustments to be mentioned.

A. *Cylindrical turning.*—Assume uniform preselected speed of rotation of the work piece 11 and uniform preselected speed of travel of the carriage 7 along the ways 6 from right to left. The tool 10 is moved toward the axis of the work until it cuts to the required diameter. Thereafter the piston 14 is not moved and cylindrical turning of the work piece is accomplished.

B. *Taper turning.*—Assume again a uniform preselected speed of rotation of the work 11 and a uniform preselected speed of travel of the carriage 7 along the ways 6 from right to left. Assume that the desired taper of the work piece is to start with a minimum diameter at the right and gradually taper to a maximum diameter at the left. The piston 14 is used to advance the tool 10 until it cuts the desired minimum diameter of the taper. Thereafter, as the tool is carried by the carriage 7 from right to left, the piston 14 is uniformly retracted, resulting in the work piece being formed to a taper whose slope is determined by the template, the speed of longitudinal travel of the carriage 7, and the speed of retraction of the piston rod 14.

C. *Shoulder turning.*—Utilizing a standard or commercial lathe I again assume a uniform preselected speed of rotation of the work piece 11 and a uniform preselected speed of travel of the carriage 7 along the ways 6 from right to left. If the turning of the work piece at a given diameter point requires an immediate change in diameter the desired result is a straight shoulder or step on the work piece with the face of the shoulder lying in a plane normal to the axis of the work piece. If the piston 14 is retracted uniformly at the correct speed the resultant or vector cutting travel of the tool 10 follows a path resultant of two interrelated movements, namely, a uniform movement from right to left axially relative the work through the agency of the lead screw 12, and a retraction along a line 45° from the axis of the work through the agency of the piston 14. Proper choice in speed of retraction of the piston 14 (relative to the speed of travel of the carriage 7) produces a movement of the tool 10 in a direction normal to the axis of the work piece and a sharp step or shoulder is cut upon the work piece. A modification in relation between the speed of movement of the carriage 7 and the speed of retraction of the piston 14 results in taper turning as previously mentioned. Such a modification is, of course, obtained in the piston travel by the cooperation of the tracer arm 24 with the template 17.

I have found that a relationship of 45° is the most universally applicable relative position of the parts. This, of course, is because 45° is midway of the 90° angular relation desired between the axis of the work piece and the face of a shoulder. Refer now to Fig. 5. The possible speed of the piston 14 from A to B is several times the lead screw speed of the carriage 7 from B to C although the actual speed of piston 14 from A to B is dictated by the template. If the angle ABC is 45° then the resultant travel of the tool will be AC and inasmuch as AC equals CB the cutting speed of the tool in machining the shoulder will be the same, and the finish will be the same, as if the tool were cutting cylindrically along a path BC.

If the angle is changed to 60°, for example, as DBC, then the finish along DC will be nearly twice as coarse as it would have been along a path BC. This is sometimes desired in step shafts. If the angle is reduced to 30° as EBC then the finish on the shoulder will be finer than it would have been along the path BC.

The mathematical analysis of the unit is based upon the sine law.

$$\frac{a}{\sin z} = \frac{c}{\sin x}$$

$\sin z$, $\sin x$ and $c$ are known $$a = \frac{c(\sin z)}{\sin x}$$

The finish is inversely proportional to the feed per revolution, therefore if the feed along $c$ is $cf$ and the resultant feed along $a$ is $af$ $$af = \frac{cf (\sin z)}{\sin x}$$

At 45° $z$ and $x$ are the same and $$af = cf$$

At 60°

$$af = cf \frac{.866}{.500} = 1.7 \; cf$$

At 30°

$$af = cf \frac{.500}{.866} = .57 \; cf$$

It will now be apparent that I have been able, through the agency of my present invention, to accomplish shoulder cutting, as for example in step shaft turning, with a single motion attachment, where previously it had been necessary to provide and utilize a dual motion arrangement. The latter has usually consisted of motive means positioning the tool 10 directly toward or away from the axis of the work piece at controllable speed and second motive means (for example a hydraulic cylinder) positioning the carriage 7 axially relative the work piece at controllable speed. In the case of such a dual motion arrangement shoulder turning is accomplished through proper interrelation of two adjustable or variable speeds of movement and at usually more than twice the apparatus and complications which I require for my described single motion attachment. In other words, within certain limitations I accomplish by my present invention what has previously been accomplished in the prior art by materially more complicated apparatus and arrangement.

In the preceding description, with the carriage 7 traveled from right to left, I am able to produce shoulders or steps going from a smaller to a large diameter. It is not practical with the same set-up and operation to produce steps going from a larger to a smaller diameter. To produce such shoulders it would be necessary to angularly move the compound 9 clockwise approximately 90° and then travel the carriage 7 from left to right. A practical solution is, if a stepped shaft, for example, is to have shoulders of both types, to first cut all of the shoulders in one direction and then to reverse the work and produce the remaining shoulders. This obviously would be accomplished in batches, i. e. a small run of shafts might be put through the machine to produce the turning and steps in one direction and then the complete batch be run through again after necessary changes in pattern, tool or the like has been made.

In so stating the limitation of my present duplicator attachment one must not lose sight of the fact that to a certain extent the same limitation exists with a dual motion arrangement, for normally the cutting angle of the tool, as well as its form or shape, will not permit the turning of approaching and receding shoulders with a single set-up and continued travel of the tool in one direction axially relative the work. It is not practical in production to grind a tool with the proper rake and relief for cutting around 180° of the tool. For taper turning the limitations are substantially the same for a single motion as for a dual motion arrangement. With the tool moved axially in one direction a decreasing diameter taper may be produced by either type of machine until the steepness of such taper approaches very closely to a normal shoulder, i. e. ceases to be a taper, whereafter neither machine will satisfactorily perform. Thus under substantially all normal conditions of lathe turning I accomplish with my single motion duplicator attachment what has previously been accomplished by a dual motion apparatus embodying considerably more equipment and complications.

Referring specifically again to Fig. 1, I indicate that the carriage 7 is traveled at a preselected uniform speed from right to left. The tool 10 is positioned toward or away from the axis of the work piece through the agency of the piston 14. The piston 14, in its movement within the cylinder 13, is under the control of a tracer assembly 16 continuously scanning a pattern or template 17. The tracer assembly 16 is rigidly mounted to an arm 18 adjustably fastened near its other end to the top slide of the compound 9. Thus the tracer assembly 16 is at all times positioned with the tool 10 relative the axis of the work piece 11 through the agency of the lead screw 12 and of the piston 14. The template 17 is shown in greater detail in Fig. 3. It is usually supported upon a bracket or pedestal clamped to the front way 6 in a manner such that it may be moved along the way. Inasmuch as the template 17 is thus adjustably fixed to the basic frame of the lathe 1, it holds an invariable relationship to the axis of the work piece 11. The tracer 16 scans the template 17 as the tool 10 travels along the work piece 11, and the result is that the work piece 11 is formed to a shape dictated by the shape of the template 17.

Figure 2:
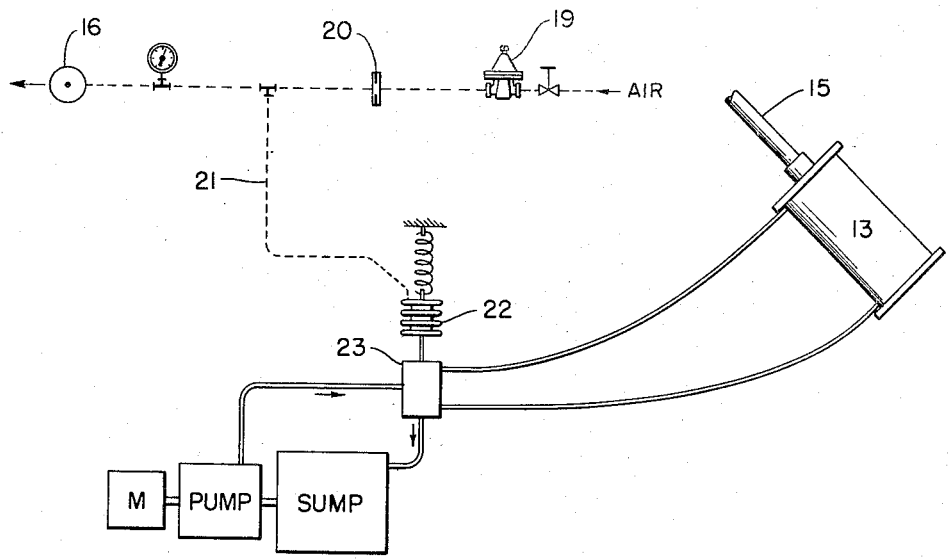
Fig. 2 is a diagrammatic illustration of the pneumatic and hydraulic control circuits employed in the embodiment of my invention shown in Fig. 1.

Referring now particularly to Fig. 2, I show therein the pneumatic and hydraulic circuits of Fig. 1. Air under pressure from any convenient source is passed through a pressure regulator 19 through an orifice 20 to the tracer assembly 16. As the discharge from the tracer 16 to the atmosphere varies the pressure in a branch 21 between the orifice 20 and the tracer 16 will vary, and such controlled air pressure representative of changes in contour of the template 17 is effective upon a bellows 22 of a pilot valve assembly 23 for control of oil or other hydraulic motive means. The pilot valve 23 is fully described and claimed in my copending application Serial No. 524,707, now Patent No. 2,475,326, granted July 5, 1949. The particular construction of the tracer assembly 16 is described and claimed in the copending application of Frederick A. Barnes, Serial No. 542,920, now Patent No. 2,436,373, granted February 24, 1948. Inasmuch as the specific structure of the relay assembly and of the tracer assembly is not herein claimed, it does not appear necessary to go into further detail than to make reference to the referred to copending applications. Suffice it to say here that the tracer assembly 16 controls the relay 23, which in turn controls the supply and bleed of oil under pressure to the cylinder 13 at opposite sides of the piston 14 for positioning the piston within the cylinder or for locking it against movement. If cylindrical turning is desired, the tool is not advanced toward or retracted from the axis of the work piece while it is being moved axially relative thereto. The speed and direction of movement of the piston 14 within the cylinder is controlled by the extent and suddenness of changes in shape of the template 17 encountered by the tracer arm 24 movable within the assembly 16 while the tracer arm 24 scans the template. The changes in shape of the template 17 may be either recesses or projections relative to the straight edge 25 of the template, and thus the tracer arm or finger 24 is responsive to both relief and impedance from the template, including longitudinal impedance, which occurs by means of longitudinal movement of the carriage 7 causing the tracer finger 24 to strike a projection on the scannable surface of the template.

Figure 3:
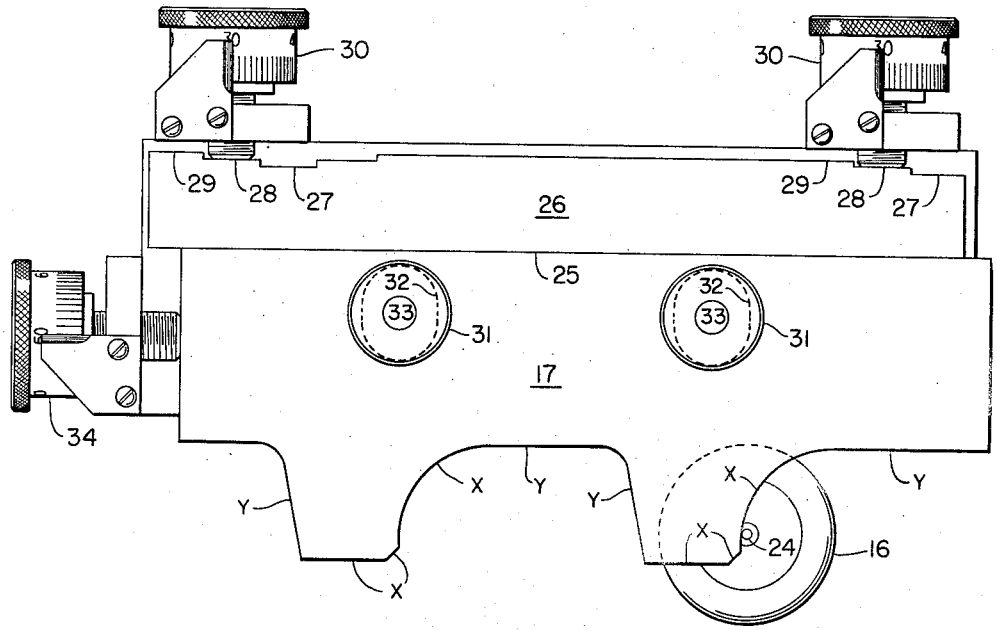
Fig. 3 is an enlarged plan view of a template and template holder shown in Fig. 1.

The particular work piece 11 illustrated in Fig. 1 is a double disc valve part. This is an ideal production piece for the apparatus being described inasmuch as the surfaces X are to be machined to a predetermined shape whereas the surfaces Y may be left unmachined. The work piece 11 is usually a casting or forging and the original relatively rough unmachined surfaces Y are not the working surfaces, and therefore do not need to be machined. Referring now to Fig. 3 it will be seen that the template 17 has the surfaces X accurately shaped to produce the desired contour of the work piece. The surfaces Y however are so sloped that as the tracer arm 24 moves thereover the tool 10 clears the corresponding surfaces on the work piece 11 without engaging or cutting the work. If a casting or forging irregularity exists as a protuberance beyond certain limits of the contour Y, then the tool in passing thereover will cut the protuberance down to the limit of Y as established by the pattern 17.

It frequently happens that the forging or casting requires one or more roughing cuts over all or a portion of its surface. In other words, a greater amount of material must be removed than may be removed by a single passage of the cutting tool thereover. Even on such roughing cuts it is essential that the general outline of the pattern be followed to conserve time and to avoid spoilage of the work pieces. In following the template even on the roughing cuts the lathe operator is free for other duties and the lathe becomes as nearly automatic as on the finishing cut which is to bring the work piece to its final dimensions as well as to its final contour or configuration.

Referring to Fig. 3, the arrangement illustrated presumes that two roughing cuts and a finish cut are to be taken on the work piece 11. The shape of the template 17, as at X and Y, is the final guide for machining the work piece. The amount the template 17 is moved toward or away from the bottom of the sheet of drawing determines the maximum thickness of the roughing and finish cuts. As shown in Fig. 3, the machine is presumably performing its second of two roughing cuts.

The template 17 is provided with a straight edge 25 parallel to the axis of the work piece. Mating with it is the straight edge of a movable block 26 provided at its opposite edge with three steps 27, 28 and 29 engageable by the adjusting micrometer screws 30. After the initial machine adjustment the filler piece 26 is so placed that the ends of adjusting screws 30 engage the surface 29. Clamping nuts 31 threaded over posts 33 are loose and allow the template 17 to be moved relative the posts 33 by way of the slots 32. The template 17 is positioned with its straight edge 25 against the filler block 26 and moved to the right or to the left by the screw 34 until a starting point on the template 17 is engaged by the tracer 24 at the time the tool 10 is at the correct starting point on the work piece 11. Thereupon the nuts 31 are tightened down, the machine placed in operation, and a first roughing cut is accomplished.

Next the tracer arm 24 is backed off by the operator, thus backing the tool away from the work piece, the machine lead screw is reversed, and the carriage 7 is returned to the right slightly beyond the desired cutting and starting point by hand. The lead screw is momentarily stopped, the nuts 31 are loosened, the filler block 26 is moved until the screws 30 engage the step 28, the template is moved back into contact with the filler block 26 and screw 34, and the nuts 31 are again tightened. The lead screw is started and a second roughing cut is accomplished. Thereafter the filler block 26 is moved until the screws 30 engage the finish cutting step 27, the template 17 moved into engaging position and clamped in place by the nuts 31 and the finish cut taken.

It will thus be seen that at all times when the tracer 24 is traversing the pattern 17 and the tool 10 is traversing the work piece 11, the cutting operation is completely under the control of the duplicating attachment whether on one or more roughing cuts or on the finish cut. During all cuts the general contour of the pattern is being followed and a minimum number of traverses of the tool over the work piece are had determined by the maximum cutting ability of the tool and machine. In some instances it may be necessary to take only a single roughing cut and a single finish cut, whereas under other circumstances it may be necessary to have two or more roughing cuts prior to the finish cut. Obviously the speed of rotation of the work piece 11, i. e. the cutting speed of the tool, may be increased for the finish cut, while the lead screw may be speeded up or slowed down on the different cuts as required. By providing the arrangement illustrated in Fig. 3, it is insured that the desired number of cuts may be taken across each of many similar work pieces with the same general results and without a great deal of adjustment or check measurement of the work piece. The arrangement also provides a ready means whereby the template 17 and filler piece 26 may be removed and replaced for interchangeably handling different shapes of work pieces.

The description so far as been concerned with external turning of work pieces. If internal contour boring is desired, it is only necessary to replace the tool 10 by the proper boring bar and operate upon the far side of the cavity in exactly the same manner as described for external turning.

Face plate turning may be accomplished in exactly the same manner and with the same limitations as described in connection with external turning. In connection with Fig. 4, I will describe an improved method of overcoming some of the limitations previously mentioned in connection with a lathe, and these as described for a vertical boring mill are equally applicable in face plate turning, as will be readily apparent.

A further specific use for my invention is in connection with the winding of springs where the pitch and lead may vary from one batch to another and with different sizes of material and of spring. I preferably provide a rotating core or mandrel on which the spring is to be wound. The tool 10 is replaced by a wire guide through which the wire is passed or pulled by the winding operation on the mandrel. It is essential that the guide move along the mandrel at a speed determined by the desired pitch of the spring.

Preferably the compound 9 would be placed at approximately 60° to the axis of the mandrel so that the retraction of the piston 14 would bear the proper relation to the lead screw travel of the carriage 7. The template 17 would be replaced by one having a gradual inclination or slope relative the axis of the work piece in a direction such that a continual uniform retraction of the piston 14 would be accomplished. Proper slope of the template would result in a vector movement of the wire guide axially of the mandrel at a speed slightly less than that produced by the lead screw alone. With the arrangement as described, the gear ratio for the lead screw would always be pitched slightly greater than the desired pitch of the spring, and thus a uniform retraction of the piston 14 would slow down such carriage travel rate to the desired rate.

One slight disadvantage of this arrangement would be that the spring wire guide would move slightly away from initial axial relationship, but never so much as to disturb the spring winding capabilities of the mechanism. With an arrangement such as I have just described it is possible to wind springs at a pitch intermediate the gear range speeds of the lead screw.

Referring now to Fig. 4, I show therein a heavy duty vertical boring mill as used in making tire molds, for example, or other large molds containing concentric depressions or cavities.

The vertical boring mill of Fig. 4 is of common type and I have therefore felt it unnecessary to show many of the details, such for example as power means for moving the saddle or head or for rotating the work table. In general, the work table 35 is rotated in desired direction at a preselected uniform speed carrying thereupon the work piece 36 which is to be formed by a single point cutting tool 37 to the desired shape through the dictates of pattern 38 scanned by the tracer arm 24.

A saddle 39 is vertically positionable along columns 40. A head 41 is horizontally positionable along cross rails 42 on the saddle 39. The head 41 corresponds in general to the cross-slide 8 of the lathe, Fig. 1. Mounted on the head 41 and angularly positionable in a vertical plane is a swivel 43 having a tool carrying ram 44 positioned by the piston rod 15 of the servo-motor 13.

I have indicated in Fig. 4 that the ram 44 is angularly positioned on the head 41 at about 45° to the horizontal and with the tool 37 engaging the left-hand wall of a generally semi-circular cavity.

The table 35 and work piece 36 are rotated past the single point cutting tool 37. The head 41 is moved at a preselected uniform rate of speed from left to right in the drawing, and during such movement the tool 37 is positioned by the ram 44, through the agency of the piston rod 15, toward or away from the work table 35 along the angle of inclination of the ram 44 and under the dictates of the tracer 24 scanning the pattern 38.

Referring now to the pattern 38, it will be observed that the portion 45 is shaped to produce the desired contour 46 on the work piece down to the greatest depth of the cavity of the mold. As the head 41 moves to the right the tracer 24 follows the surface 45 to the lowermost point, and then follows an incline 47 so shaped as to give clearance of the tool 37 over the portion 48 of the work piece. Continued travel of the head 41 to the right performs a cutting operation across the surface 49 until the tool reaches a point near the axis of rotation of the table 35 and work piece 36. The operator then reverses the direction of rotation of the table 35 and work piece 36 while the tool 37 passes over the already machined surface 50 and starts to cut the contour 51 (which is the contour 48) under the dictates of the tracer arm 24 scanning the surface 52. Continued motion of the head 41 to the right engages the template surface 53 by the tracer arm 24, preventing the tool 37 from engaging the already machined contour 54.

Thus it will be seen that a machining cut is taken across the entire surface of the work piece 36 by one continued movement of the head 41 from left to right, it being necessary only to reverse direction of rotation of the table 35 and work 36 as the tool 37 passes the axis of rotation. During the initial half of its left to right travel the tool 37 machines the surfaces 46, 49, 50, 51 and during the latter half of its left to right movement it machines the surfaces 54, 48. In this manner the only change or adjustment necessary is a reversal of rotation of the table 35 and work piece 36. It is not necessary to make any change in the angular position of the compound 43 relative to the carriage 41. Successive roughing and finishing cuts may be taken through adjustment of the template 38 exactly as described in connection with the template 17 of Fig. 1.

It is apparent that exactly the same method of operation may be utilized in connection with face plate turning with the lathe of Fig. 1 to pass the tool completely across the face of the work and change the rotation of the work as the center of rotation is passed. The movement of the head 41 along the rails 42 is continuously uniform at a preselected power feed. The movement of the cross-slide 8 across the carriage 7 (for face plate turning) may be continuously uniform at a preselected power feed but usually is by the operator turning a handwheel on the apron of the carriage 7.

It is apparent (referring to Fig. 4) that the tracer assembly 16 may be rigidly supported from the saddle 39 and the template may be supported by and moved with the ram 44. This is the reverse of what is shown in Fig. 4. Certain advantages and disadvantages accrue from such an arrangement. The tracer assembly being in a fixed location, relative the various levers and handwheels of the machine as a whole, allows the operator to grasp the tracer arm 24 and move it by hand if he desires to retract or advance the tool 37 for any reason, as for example in high speed return of the tool for beginning a next cutting path. However, the template would be upside down and backwards.

It will thus be observed that I have provided an apparatus of what I term a single motion type adaptable to a variety of metal forming machines for accomplishing substantially the same functional operation performed by those machines known in the prior art as dual motion machines. I have provided a duplicating attachment susceptible of ready application to and removal from an existing standard machine tool without so changing the machine tool that it becomes a special tool not available for standard operation. After a duplicating or contouring operation or a series of operations have been accomplished, the attachment may be removed leaving the machine in its normal or standard condition. One reason why it is advisable to point out this advantage is by comparison with the prior dual motion machines. Such prior machines have of necessity required the permanent removal of the normal lead screw and its replacement by a special controllable hydraulic cylinder or other servo-motor. It thus becomes rather impractical to change the machine tool from a standard tool to a special contouring or duplicating tool and back again. Such is not the case through the utilization of my present invention.

What I claim as new, and desire to secure by Letters Patent of the United States, is:

1. In combination with a machine tool having a frame with work holder means for rotating a workpiece thereon and having a tool holder movable on the frame relative to the workpiece, means to move the tool holder at a given speed relative to the workpiece along a first path in a first feed direction, and controllable power means connected directly to and substantially in alignment with the tool holder for positioning the tool holder relative to the workpiece at a controllable speed and direction along a second path at an acute angle to said first path, whereby the movement of said tool holder along the second path has a component along said first path, a pattern device, a tracer device having a movable finger adapted to scan the pattern device in accordance with the movement of the tool holder as it traverses the workpiece, said pattern and tracer devices contacting each other in a reference plane, the cutting movement of the tool holder being the vector resultant of the directions and speeds of the two motions, said controllable power means being controlled by the tracer and pattern devices and comprising a cylinder and a piston dividing the cylinder into two fluid chambers, a fluid pressure pump having an outlet and an inlet, a directional valve having a fluid entrance conduit and a fluid discharge conduit connected respectively to said outlet and inlet of said pump, said directional valve having two fluid directional control conduits connected respectively to said fluid chambers of said cylinder, said directional valve selectively controlling the flow of fluid from the pump outlet to a selected one of said fluid chambers and from the other of said fluid chambers to said pump inlet for moving the tool holder relative to the work holder means along said second path, means biasing said movable finger to a normal position uninfluenced by said pattern device causing said controllable power means to move said tool holder toward said work holder means, and said movable finger being mounted to be universally movable by contact with said pattern device throughout three hundred sixty degrees in said reference plane in a direction opposing said bias causing said controllable power means to move said tool holder away from said work holder means, said movable finger being responsive to relief and impedance from said pattern device, including impedance in a direction of said first feed direction for governing the directional valve.

2. In a pattern and tracer controlled machine tool having a frame carrying a work holder for supporting a workpiece, a carriage, said frame and said carriage having slidable guide surfaces providing a first feed path along which they may move relative to each other, a cross slide translatable on said carriage at right angles to said first feed path, a tool support mounted on said cross slide, said tool support comprising a guide support and slidable tool holder having relatively slidable surfaces providing a second feed path along which they may move relative to each other, means for mounting the guide support to the carriage whereby said slidable tool holder bodily moves a tool toward and away from the workpiece along said second path at an acute angular direction to said first feed path, tool positioning means including pattern control means and tracer control means, first mounting means for mounting one of said control means fixedly with respect to said frame, second mounting means for mounting the other of said control means fixedly with respect to said slidable tool holder, said pattern control means and said tracer control means contacting each other and defining a reference contacting plane by the relative movements therebetween, feed means cooperating with said carriage and including first motive means operating independently of said tool positioning means to move at least one of said holders in the first direction along said first feed path relative to the other holder, and second motive power means including a hydraulically operated servo-motor carried by the tool support and having at least two relatively movable power elements connected to said guide support and said slidable tool holder respectively for bodily moving said slidable tool holder both positively toward and away from the workpiece in said acute angular direction, said movement of the slidable tool holder away from said workpiece moving said tool in a direction opposed to said first direction, said tracer control means having a movable valve for producing a variable fluid pressure in said tracer control means for governing the servo-motor to move the tool along said second path at said acute angular direction, said tracer control means having a finger element for moving said movable valve therein, said finger element being universally movable by contact with said pattern control means throughout 360° in said reference contacting plane.

3. A contour turning lathe for reproducing tapers, curves, right-angle shoulders or undercut shoulders on the work in conformity with the profile of a template, including a headstock and a tailstock for holding and turning the work, a carriage, means for guiding the carriage longitudinally of the work, means for moving the carriage at a constant rate of advance, a template disposed in fixed position parallel with the axis of the work with its profile in a plane parallel with the cutting plane, a top slide carrying a work engaging cutting tool, a cross slide movably mounting the top slide on the carriage whereby the top slide is adapted to reciprocate at an angle to the axis of the work acute in the direction of carriage travel, tracer mechanism mounted on the top slide having a finger which engages the template and is universally movable relatively to the tracer mechanism in the plane of said profile and is responsive to relief and impedance from the template, including longitudinal impedance, and a hydraulic system including a motor for reciprocating the top slide, said system so connecting the tracer and the motor that actuation of the tracer by the template operates the motor to move the top slide to neutralize the actuation of the tracer, thus reproducing on the work the profile of the template.

4. A contour turning lathe for reproducing tapers, curves, right-angle shoulders or undercut shoulders on the work in conformity with the profile of a template, including a headstock and a tailstock for holding and turning the work, a carriage, means for guiding the carriage longitudinally of the work, means for moving the carriage at a constant rate of advance, a slide carrying a work engaging cutting tool and movably mounted on the carriage whereby said slide is adapted to reciprocate at an angle to the axis of the work acute in the direction of carriage travel, a template disposed in fixed position and having an axis parallel with the axis of the work with its profile in a plane substantially parallel to the plane of movement of said slide, tracer mechanism mounted on said slide having a finger which engages the template and is universally movable relatively to the tracer mechanism in the plane of said profile and is responsive to relief and impedance from the template, including longitudinal impedance, and a hydraulic system including a motor for reciprocating said slide, said system so connecting the tracer and the motor that actuation of the tracer by the template operates the motor to move said slide to neutralize the actuation of the tracer, thus reproducing on the work the profile of the template.

References Cited in the file of this patent

UNITED STATES PATENTS

| | | |
|---|---|---|
| 1,166,126 | Gridley | Dec. 28, 1915 |
| 1,241,723 | Eaton | Oct. 2, 1917 |
| 1,492,103 | Parkes | Apr. 29, 1924 |
| 1,956,505 | Horner | Apr. 24, 1934 |
| 2,016,931 | Richard | Oct. 8, 1935 |
| 2,127,523 | Kraus | Aug. 23, 1938 |
| 2,165,411 | Peyton | July 11, 1939 |
| 2,259,472 | Johnson | Oct. 21, 1941 |
| 2,331,443 | Von Zelewsky | Oct. 12, 1943 |
| 2,352,661 | Snader | July 4, 1944 |
| 2,402,450 | Salisbury | June 18, 1946 |
| 2,405,550 | Bishop | Aug. 13, 1946 |
| 2,437,570 | Von Zelewsky | Mar. 9, 1948 |

FOREIGN PATENTS

| | | |
|---|---|---|
| 217,571 | Switzerland | Oct. 31, 1941 |
| 386,270 | Great Britain | Jan. 12, 1933 |